(12) United States Patent
Asako (10) Patent No.: US 10,017,150 B2
(45) Date of Patent: Jul. 10, 2018

(54) SEAT BELT RETRACTOR AND SEAT BELT APPARATUS

(71) Applicant: JOYSON SAFETY SYSTEMS JAPAN K.K., Tokyo (JP)

(72) Inventor: Tadayuki Asako, Tokyo (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 0 days.

(21) Appl. No.: 15/021,488

(22) PCT Filed: Sep. 3, 2014

(86) PCT No.: PCT/JP2014/073155
§ 371 (c)(1),
(2) Date: Mar. 11, 2016

(87) PCT Pub. No.: WO2015/037487
PCT Pub. Date: Mar. 19, 2015

(65) Prior Publication Data
US 2016/0221534 A1  Aug. 4, 2016

(30) Foreign Application Priority Data

Sep. 13, 2013 (JP) ................................. 2013-190246

(51) Int. Cl.
*B60R 22/36* (2006.01)
*B60R 22/46* (2006.01)
*B60R 22/34* (2006.01)

(52) U.S. Cl.
CPC .............. *B60R 22/36* (2013.01); *B60R 22/46* (2013.01); *B60R 22/4628* (2013.01); *B60R 2022/3402* (2013.01)

(58) Field of Classification Search
CPC ...... B60R 22/36; B60R 22/4628; B60R 22/46; B60R 2022/3402
See application file for complete search history.

(56) References Cited

U.S. PATENT DOCUMENTS 3,741,494 A * 6/1973 Fiala .......................... F16F 7/12
188/373
5,351,485 A * 10/1994 Hiruta ................. B60R 22/4628
242/374
5,383,623 A * 1/1995 Hiruta ................. B60R 22/4628
242/374

(Continued)

FOREIGN PATENT DOCUMENTS

JP  2001-163182 A  6/2001
JP  2001-301567 A  10/2001

(Continued)

OTHER PUBLICATIONS

International Search Report for PCT/JP2014/73155 dated Dec. 9, 2014.

*Primary Examiner* — Paul N Dickson
*Assistant Examiner* — Timothy Wilhelm
(74) *Attorney, Agent, or Firm* — Foley & Lardner LLP (57) ABSTRACT

Provided are a seat belt retractor and a seat belt apparatus the number of components of which can be reduced and the size and weight of which can be reduced. A pretensioner 5 includes a rotor 51 that is connected coaxially with a spool 2 and that has a plurality of engaging teeth 51a formed on the outer periphery thereof, a power generating means 52 that engages with the engaging teeth 51a and rotates the rotor 51, and a cover member 53 that houses at least the rotor 51, and the cover member 53 is disposed inside the base frame 3, and can bear the spool 2.

6 Claims, 5 Drawing Sheets

(56) References Cited

U.S. PATENT DOCUMENTS

| | | | | |
|---|---|---|---|---|
| 5,451,008 A | * | 9/1995 | Hamaue | B60R 22/4628 242/374 |
| 5,485,970 A | * | 1/1996 | Steffens, Jr. | B60R 22/1951 242/374 |
| 5,690,295 A | * | 11/1997 | Steinberg | B60R 22/4628 242/374 |
| 5,881,962 A | * | 3/1999 | Schmidt | B60R 22/4628 242/374 |
| 6,419,176 B1 | * | 7/2002 | Mizuno | B60R 22/4628 242/374 |
| 6,523,769 B2 | * | 2/2003 | Hamaue | B60R 22/4628 242/374 |
| 6,722,600 B2 | * | 4/2004 | Hamaue | B60R 22/4628 242/374 |
| 7,124,974 B2 | * | 10/2006 | Shiotani | B60R 22/4628 242/374 |
| 7,761,207 B2 | * | 7/2010 | Midorikawa | B60R 22/44 280/807 |
| 7,988,084 B2 | * | 8/2011 | Lombarte | B60R 22/4628 242/374 |
| 8,220,735 B2 | * | 7/2012 | Wang | B60R 22/3413 242/374 |
| 8,371,613 B2 | * | 2/2013 | Hodatsu | B60R 22/4628 242/374 |
| 8,678,509 B2 | * | 3/2014 | Shiotani | B60R 22/4633 242/374 |
| 8,746,803 B2 | * | 6/2014 | Shiotani | B60R 22/4628 242/374 |
| 9,079,565 B2 | * | 7/2015 | Koprowicz | B60R 22/4676 |
| 2001/0035472 A1 | | 11/2001 | Hamaue et al. | |
| 2001/0040199 A1 | | 11/2001 | Takehara et al. | |
| 2002/0053621 A1 | | 5/2002 | Shiotani et al. | |
| 2004/0227030 A1 | | 11/2004 | Nagata et al. | |
| 2011/0215184 A1 | | 9/2011 | Clute et al. | |
| 2012/0049500 A1 | * | 3/2012 | Wang | B60R 22/4628 280/806 |

FOREIGN PATENT DOCUMENTS

| | | |
|---|---|---|
| JP | 2002-145012 A | 5/2002 |
| JP | 2002-326558 A | 11/2002 |
| JP | 2012-509808 T | 4/2012 |

* cited by examiner

(A) CONVENTIONAL ART
(COMPARATIVE EXAMPLE 1)

(B) CONVENTIONAL ART
(COMPARATIVE EXAMPLE 2)

(C) FIRST EMBODIMENT (D) MODIFICATION

SEAT BELT RETRACTOR AND SEAT BELT APPARATUS

TECHNICAL FIELD

The present invention relates to a seat belt retractor and a seat belt apparatus, and more specifically, to a seat belt retractor suitable for the reduction in the number of components, size, and weight, and a seat belt apparatus having the seat belt retractor.

BACKGROUND ART

Vehicles such as automobiles are generally provided with a seat belt apparatus that restrains an occupant in a seat including a seat portion in which the occupant is seated and a backrest portion located behind the occupant. Such a seat belt apparatus includes a webbing that restrains an occupant, a seat belt retractor that retracts the webbing, a guide anchor that is provided on the vehicle body side and that guides the webbing, a belt anchor that fixes the webbing to the vehicle body, a buckle disposed on the side of the seat, and a tongue disposed on the webbing, and restrains the occupant in the seat with the webbing by fitting the tongue into the buckle. In such a seat belt apparatus, one end of the webbing is fixed to the belt anchor, and the other end of the webbing is passed through the guide anchor and is connected to the seat belt retractor.

It is becoming common that such a seat belt retractor includes a locking mechanism that stops the withdrawal of the webbing when the vehicle is inclined or rapidly decreased in speeds in a vehicle collision or the like, and a pretensioner that takes up the slack in the webbing in a vehicle collision or the like (see, for example, Patent Literature 1 and Patent Literature 2).

In the seat belt retractor described in Patent Literature 1, a locking mechanism (4, 5) is disposed on one outer side (1A) of a base frame (1), a pretensioner (10) including driving means (11, 12, 15) and the like is disposed on the other outer side (1B) of the base frame (1), and a spring unit (8) is disposed on the outer side thereof. A pretensioner plate (31) for rotatably supporting a spool is disposed between the base frame and the pretensioner.

In the seat belt retractor described in Patent Literature 2, a spring unit is disposed on one outer side of a base frame (8), a pretensioner including a drive unit (7) is disposed on the other outer side of the base frame (8), and a locking mechanism including a pawl (4) and a control unit (10) is disposed on the outer side thereof. A bearing ring (13) for rotatably supporting a spool is disposed between the base frame and the pretensioner.

CITATION LIST

Patent Literature

Patent Literature 1: Japanese Unexamined Patent Application Publication No. 2002-145012
Patent Literature 2: Japanese Unexamined Patent Application Publication (Translation of PCT Application) No. 2012-509808

SUMMARY OF INVENTION

Technical Problem

As described in Patent Literature 1 and Patent Literature 2, the seat belt retractor has a complex mechanism and a large number of components, and therefore there is a problem in that cost reduction is difficult. Because the above-described seat belt retractor is a component disposed in a small space of a vehicle body, reduction in size and weight is desired. However, as described in Patent Literature 1 and Patent Literature 2, the spring unit, locking mechanism, and pretensioner are disposed on both sides of the base frame, and therefore there is a problem in that reduction in size and weight is difficult.

The present invention is made in view of such problems, and it is an object of the present invention to provide a seat belt retractor and a seat belt apparatus the number of components of which can be reduced and the size and weight of which can be reduced.

Solution to Problem

The present invention provides a seat belt retractor including a spool that retracts a webbing that restrains an occupant, a base frame that rotatably houses the spool, and a pretensioner that retracts the webbing to take up the slack therein in an emergency, wherein the pretensioner includes a rotor that is connected coaxially with the spool and that has a plurality of engaging teeth formed on the outer periphery thereof, a power generating means that engages with the engaging teeth and rotates the rotor, and a cover member that houses at least the rotor, and the cover member is disposed inside the base frame.

The present invention provides a seat belt apparatus including a webbing that restrains an occupant, a seat belt retractor that retracts the webbing, a belt anchor that fixes the webbing to a vehicle body, a buckle disposed on a side face of a seat, and a tongue disposed on the webbing, wherein the seat belt retractor includes a spool that retracts the webbing, a base frame that rotatably houses the spool, and a pretensioner that retracts the webbing to take up the slack therein in an emergency, the pretensioner includes a rotor that is connected coaxially with the spool and that has a plurality of engaging teeth formed on the outer periphery thereof, a power generating means that engages with the engaging teeth and rotates the rotor, and a cover member that houses at least the rotor, and the cover member is disposed inside the base frame.

In the above-described seat belt retractor and seat belt apparatus, the cover member may be able to bear the spool directly or indirectly. The cover member may have an opening through which an end of the spool can be passed, and may be configured to support the radial load of the spool with the inner edge of the opening.

A locking mechanism that stops the withdrawal of the webbing in an emergency or a spring unit that biases the spool in the retracting direction may be disposed outside the base frame in which the cover member is disposed.

The power generating means may include an projectile that engages with the engaging teeth and rotates the rotor, a guide pipe that houses the projectile and guides the driving, and a gas generator that is disposed at an end of the guide pipe and that imparts power to the projectile. After forming a frame body in which the guide pipe and the cover member are fixed to the base frame, other components may be assembled.

Advantageous Effects of Invention

According to the seat belt retractor and seat belt apparatus of the present invention described above, since the cover member of the pretensioner is disposed inside the base frame, the opening of the cover member can be used as a bearing for the spool or as part of the locking mechanism, a pretensioner plate and a bearing ring that are conventionally disposed separately from the cover member can be omitted, and the number of components can be reduced. In addition, since the pretensioner is disposed inside the base frame, the degree of freedom in designing the locking mechanism and the pretensioner can be improved, an optimum arrangement can be achieved, and the size and weight of the seat belt retractor can be reduced.

DESCRIPTION OF EMBODIMENTS

Figure 1:
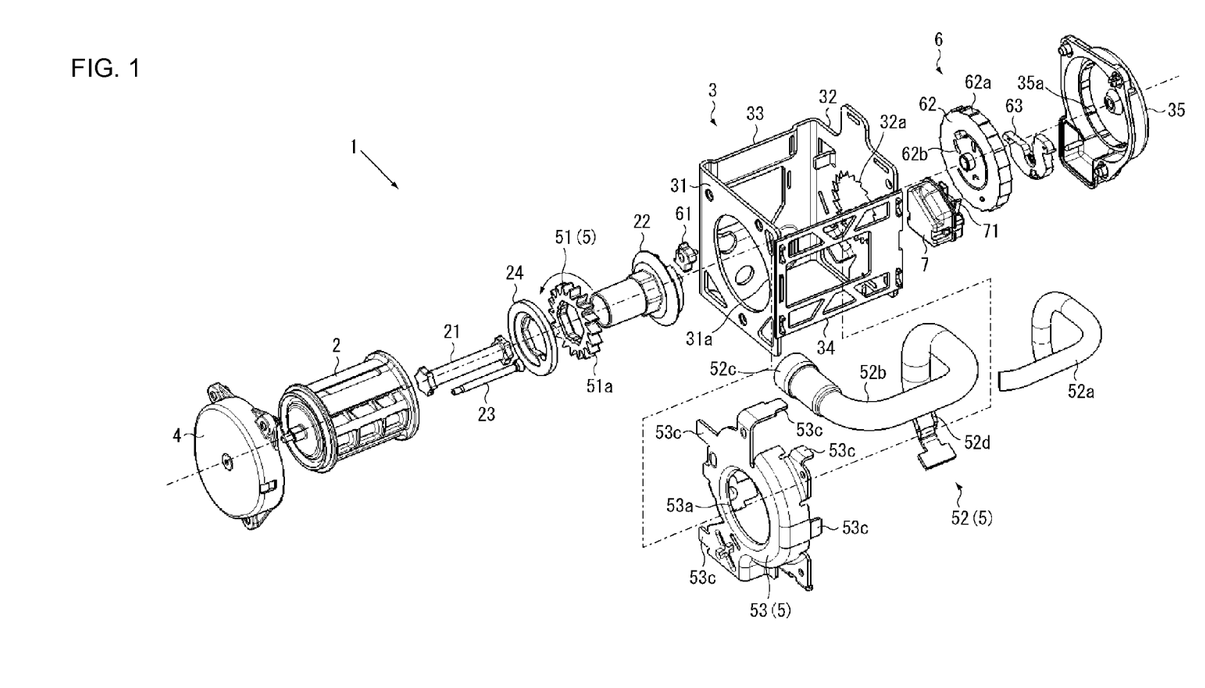
FIG. 1 is an exploded view showing a seat belt retractor according to a first embodiment of the present invention.
Figure 2:
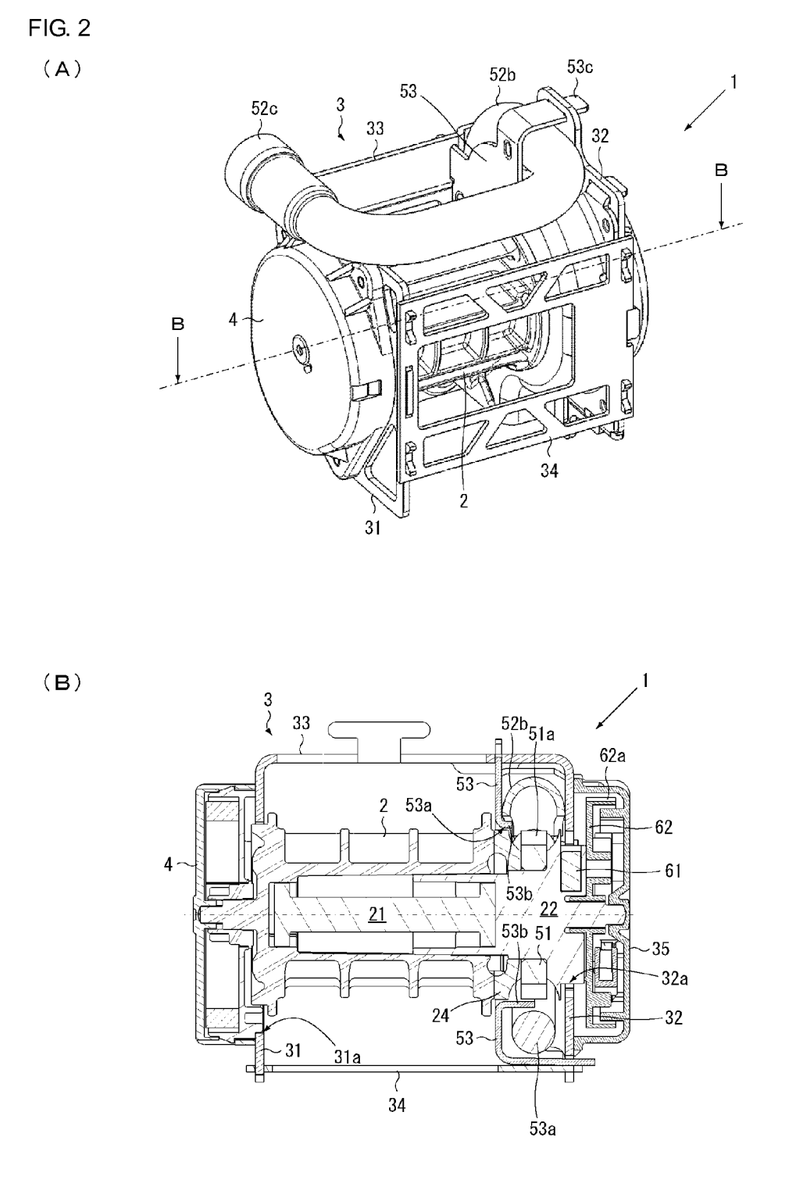
FIG. 2 shows the seat belt retractor shown in FIG. 1, (A) is a perspective view, and (B) is a cross-sectional view taken along line B-B of FIG. 2 (A).

Embodiments of the present invention will now be described with reference to FIG. 1 to FIG. 6. Here, FIG. 1 is an exploded view showing a seat belt retractor according to a first embodiment of the present invention. FIG. 2 shows the seat belt retractor shown in FIG. 1, (A) is a perspective view, and (B) is a cross-sectional view taken along line B-B of FIG. 2 (A).

The seat belt retractor 1 according to the first embodiment of the present invention includes, as shown in FIG. 1 and FIG. 2, a spool 2 that retracts a webbing that restrains an occupant, a base frame 3 that rotatably houses the spool 2, a spring unit 4 that biases the spool 2 in the retracting direction, a pretensioner 5 that retracts the webbing to take up the slack therein in an emergency, and a locking mechanism 6 that stops the withdrawal of the webbing in an emergency. The pretensioner 5 has a rotor 51 that is connected coaxially with the spool 2 and that has a plurality of engaging teeth 51a formed on the outer periphery thereof, a power generating means 52 that engages with the engaging teeth 51a and rotates the rotor 51, and a cover member 53 that houses at least the rotor 51. The cover member 53 is disposed inside the base frame 3 and can bear the spool 2. In each figure, the depiction of the webbing is omitted.

The spool 2 is a winding drum that retracts the webbing. One end of the spool 2 is connected to the spring unit 4. The spool 2 is biased in the direction of retracting the webbing by a spiral spring housed in the spring unit 4. The means for imparting a retracting force to the spool 2 is not limited to the spring unit 4, and may be another means employing an electric motor or the like.

A torsion bar 21 forming a central shaft is passed through a cavity formed in the central part of the spool 2. One end of the torsion bar 21 is connected to the inner surface of the end of the spool 2 to which the spring unit 4 is connected. The other end of the torsion bar 21 is connected to a locking base 22. The configuration of the impact absorption mechanism including the torsion bar 21 is not limited to the shown configuration. For example, one end of the torsion bar 21 may be connected to the spring unit 4 through the spool 2. The configuration of the impact absorption mechanism including the torsion bar 21 may be omitted when unnecessary.

One end of the locking base 22 is passed through the cavity of the spool 2, and the other end of the locking base 22 is rotatably supported by a retainer cover 35. A shaft portion on which the rotor 51 and a deformation plate 24 described later are fitted is formed at one end of the locking base 22, and an engaging pawl 61 of the locking mechanism 6 is rotatably disposed at the other end of the locking base 22.

Therefore, at normal time when the pretensioner 5 and the locking mechanism 6 are not in operation, the torsion bar 21 rotates integrally with the spool 2. When the pretensioner 5 is in operation, the webbing can be retracted on the spool 2 by rotating the torsion bar 21. When the locking mechanism 6 is in operation, the rotation of the torsion bar 21 is restrained, and the withdrawal of the webbing is suppressed by locking the rotation of the spool 2.

When a force in the withdrawing direction acts on the webbing, because the spool 2 is cantilever-supported by the torsion bar 21, the load of the webbing can be limited by the torsional deformation of the torsion bar 21, and the impact energy of the occupant is absorbed.

A deformation pin 23 made of metal is inserted into the end face of the spool 2 on the side on which the pretensioner 5 is disposed such that the head thereof is exposed. A deformation plate 24 having a protrusion engageable with the head of the deformation pin 23 is fitted on the shaft portion of the locking base 22. The deformation pin 23 and the deformation plate 24 may be formed integrally with each other.

Therefore, when the spool 2 is rotated by the webbing being withdrawn with the locking mechanism 6 in operation, a force that attempts to pluck the deformation pin 23 in the direction of rotation acts. The deformation pin 23 is drawn between an end face of the spool 2 and the deformation plate 24 and plastically deformed, and absorbs the impact energy of the occupant.

By disposing such a deformation pin 23 and such a deformation plate 24, the energy absorption capacity can be improved. When the torsion bar 21 has sufficient energy absorption capacity, the deformation pin 23 and the deformation plate 24 may be omitted.

The base frame 3 is a case that forms the framework of the seat belt retractor 1. The base frame 3 includes, for example, a pair of opposed end faces 31 and 32, a side face 33 connecting these end faces, and a tie plate 34 opposed to the side face 33 and connected to the end faces 31 and 32. The spring unit 4 is disposed on the outer side of the end face 31, the pretensioner 5 is disposed on the inner side of the end face 32, and the locking mechanism 6 is disposed on the outer side of the end face 32. The locking mechanism 6 is housed in the retainer cover 35 connected to the base frame 3.

A vehicle sensor 7 that detects rapid deceleration and inclination of the vehicle body is disposed in the retainer cover 35. The vehicle sensor 7 has a spherical mass body (not shown) housed therein and an actuator 71 rocked by the movement of the mass body, and is housed in a recess formed in the retainer cover 35. Such a vehicle sensor 7 is configured such that when rapid deceleration or inclination occurs in the vehicle body, the mass body moves upward, and accordingly the tip of the actuator 71 is rocked upward. By this rocking, the actuator 71 is engaged with external teeth 62a of a lock gear 62 described later. The vehicle sensor 7 may also be configured to transmit a detection signal to other electronic components and an electric control system mounted on the vehicle when rapid deceleration or inclination of the vehicle body is detected.

The pretensioner 5 includes a rotor 51 that is connected to the end of the spool 2 with the torsion bar 21 and the locking base 22 therebetween, a power generating means 52 that rotates the rotor 51, and a cover member 53 that houses the rotor 51. The rotor 51 has a plurality of engaging teeth 51a formed so as to protrude radially outward.

The power generating means 52 includes, for example, an projectile 52a that engages with the engaging teeth 51a and rotates the rotor 51, a guide pipe 52b that houses the projectile 52a and guides the driving, and a gas generator 52c that is disposed at an end of the guide pipe 52b and that imparts power to the projectile 52a.

The projectile 52a is, for example, a rod made of synthetic resin, and is configured such that when pressure is applied to the end of the projectile 52a, the projectile 52a moves in the guide pipe 52b while plastically deforming along the shape of the guide pipe 52b. The projectile 52a is set to such a length that the back end of the projectile 52a is not discharged from the guide pipe 52b when the operation of the pretensioner 5 is completed. Owing to such a configuration, discharge of gas from the guide pipe 52b to the outside after the operation of the pretensioner 5 is completed can be suppressed. The projectile 52a is not limited to a rod member, and may be, for example, a plurality of spheres made of metal or synthetic resin, or a plurality of twin balls that are each formed by connecting two spheres made of metal or synthetic resin.

The front end of the guide pipe 52b is disposed at a position facing the engaging teeth 51a of the rotor 51. The back end of the guide pipe 52b is extended by a length necessary for the movement of the projectile 52a, and is disposed along the outline of the seat belt retractor 1. A cutout 52d is formed in part of the outer periphery of the front end of the guide pipe 52b so that the engaging teeth 51a of the rotor 51 can rotate from this cutout 52d through the inside of the guide pipe 52b.

The gas generator 52c is, for example, a micro gas generator that jets gas into the guide pipe 52b in response to a detection signal from the vehicle sensor 7 or an acceleration sensor mounted in the vehicle body. A piston (not shown) that seals the gap between the projectile 52a and the peripheral surface of the guide pipe 52b and forms a pressure receiving surface may be disposed between the gas generator 52c and the projectile 52a.

According to such a power generating means 52, at normal time, a state where the projectile 52a is housed in the guide pipe 52b is maintained by the rigidity of the projectile 52a. When gas is generated from the gas generator 52c, the projectile 52a moves in the guide pipe 52b while plastically deforming, and is discharged from the front end of the guide pipe 52b into the cover member 53. At this time, the projectile 52a engages with the engaging teeth 51a of the rotor 51 while plastically deforming, and rotates the engaging teeth 51a in the direction of the arrow in the figure. The projectile 52a moves along the outline of the cover member 53, finally, comes into contact with the guide pipe 52b, the projectile 52a itself, the cover member 53, or another component and stops.

The cover member 53 is a metal component having a substantially bowl shape or a substantially box shape, and is fixed to the inner sides of the end face 32 and the side face 33 of the base frame 3. As shown in FIG. 1 and FIG. 2 (B), the cover member 53 has an opening 53a through which the end of the spool 2 can be passed, and is configured to support the radial load of the spool 2 with the inner edge of the opening 53a indirectly with the deformation plate 24 therebetween, and the opening 53a forms a bearing for the spool 2. In this embodiment, a bent portion 53b is formed by bending the inner edge of the opening 53a toward the end face 32, and a bearing is formed by this bent portion 53b.

When the deformation plate 24 is omitted, a bearing may be formed such that the radial load of the spool 2 is supported directly by the inner edge of the opening 53a of the cover member 53, or the spool 2 may be borne with a component other than the deformation plate 24 therebetween. The bent portion 53b may also be formed by bending the inner edge of the opening 53a toward the end face 31.

Because the end of the spool 2 is rotatably supported also by the retainer cover 35, a minor load bearing can be formed by the retainer cover 35, and a major load bearing can be formed by the cover member 53. The thrust load of the spool 2 may be supported by the retainer cover 35, or may be supported by the cover member 53.

The locking mechanism 6 includes an engaging pawl 61 (pawl) rockably disposed on the end face of the locking base 22, a lock gear 62 that rotates the engaging pawl 61 inward, and a flywheel 63 disposed in a space formed between the lock gear 62 and the retainer cover 35. An opening 32a through which the locking base 22 can be passed is formed in the end face 32 of the base frame 3, and internal teeth are formed on the inner edge of the opening 32a. The engaging pawl 61 is disposed engageably with the internal teeth of the opening 32a.

The lock gear 62 is fitted on a shaft portion of the locking base 22 that is supported by the retainer cover 35, and external teeth 62a are formed on the outer periphery of the lock gear 62. The actuator 71 of the vehicle sensor 7 is engaged with the external teeth 62a. The flywheel 63 is rockably disposed on the outer side of the lock gear 62. A circular recess is formed in the retainer cover 35, and internal teeth 35a are formed inside this recess. The tip of the flywheel 63 is engaged with the internal teeth 35a. The tip of the flywheel 63 is biased by a spring (not shown) away from the internal teeth 35a.

A cam hole 62b that is formed so as to curve from the outer edge side toward the inner edge side is formed in the flat portion of the lock gear 62. A pin (not shown) formed on a side face of the engaging pawl 61 is passed through the cam hole 62b. This pin moves along the cam hole 62b with the rotation of the lock gear 62, and the engaging pawl 61 is rocked. The tip of the engaging pawl 61 may be biased by a spring (not shown) away from the internal teeth of the opening 32a.

The flywheel 63 is a mass body rockably disposed between the retainer cover 35 and the lock gear 62. The biasing force of the flywheel 63 (the elastic force of the spring) is set larger than the inertial force generated in the flywheel 63 when the withdrawal acceleration of the webbing does not exceed a predetermined threshold. In this case, the flywheel 63 rotates together with the lock gear 62.

On the other hand, when the withdrawal acceleration of the webbing exceeds the predetermined threshold, the inertial force generated in the flywheel 63 is larger than the biasing force (the elastic force of the spring), and the tip of the flywheel 63 approaches and engages with the internal teeth 35a of the retainer cover 35.

According to the locking mechanism 6 having such a configuration, at normal time, the actuator 71, the flywheel 63, and the engaging pawl 61 are not engaged with each other, and therefore the locking base 22 and the lock gear 62 rotate with the rotation of the spool 2.

When the webbing is faster than a normal withdrawal acceleration, that is, when the withdrawal acceleration of the webbing exceeds the predetermined threshold, the flywheel 63 rocks and engages with the internal teeth 35a of the retainer cover 35, and the rotation of the lock gear 62 is restrained. On the other hand, the locking base 22 attempts to continue to rotate, therefore relative rotation occurs between the locking base 22 and the lock gear 62, accordingly the engaging pawl 61 moves along the cam hole 62b, and the tip of the engaging pawl 61 engages with the internal teeth formed on the inner edge of the opening 32a of the base frame 3. As a result, the rotation of the locking base 22 is restrained.

In the above-described embodiment, the description has been given of the case where the engaging pawl 61 is engaged with the base frame 3. However, internal teeth engageable with the engaging pawl 61 may be formed in the opening 53a of the cover member 53, and the spool 2 may be borne by the opening 32a of the base frame 3.

When the vehicle sensor 7 detects rapid deceleration or inclination of the vehicle body, the actuator 71 engages with the external teeth 62a of the lock gear 62, and the rotation of the lock gear 62 is restrained. When the webbing is going to be withdrawn in that state, relative rotation occurs between the locking base 22 and the lock gear 62, accordingly the engaging pawl 61 moves along the cam hole 62b, and the tip of the engaging pawl 61 engages with the internal teeth formed on the inner edge of the opening 32a of the base frame 3. As a result, the rotation of the locking base 22 is restrained.

According to the seat belt retractor 1 of the first embodiment described above, the cover member 53 of the pretensioner 5 is disposed inside the base frame 3, therefore the side face of the base frame 3 can be used as a bearing for the spool 2, a pretensioner plate and a bearing ring that are conventionally disposed separately from the cover member 53 can be omitted, and the number of components can be reduced. In addition, since the pretensioner 5 is disposed inside the base frame 3, the number of components disposed outside the base frame 3 can be reduced, and the size of the seat belt retractor 1 can be reduced.

Figure 3:
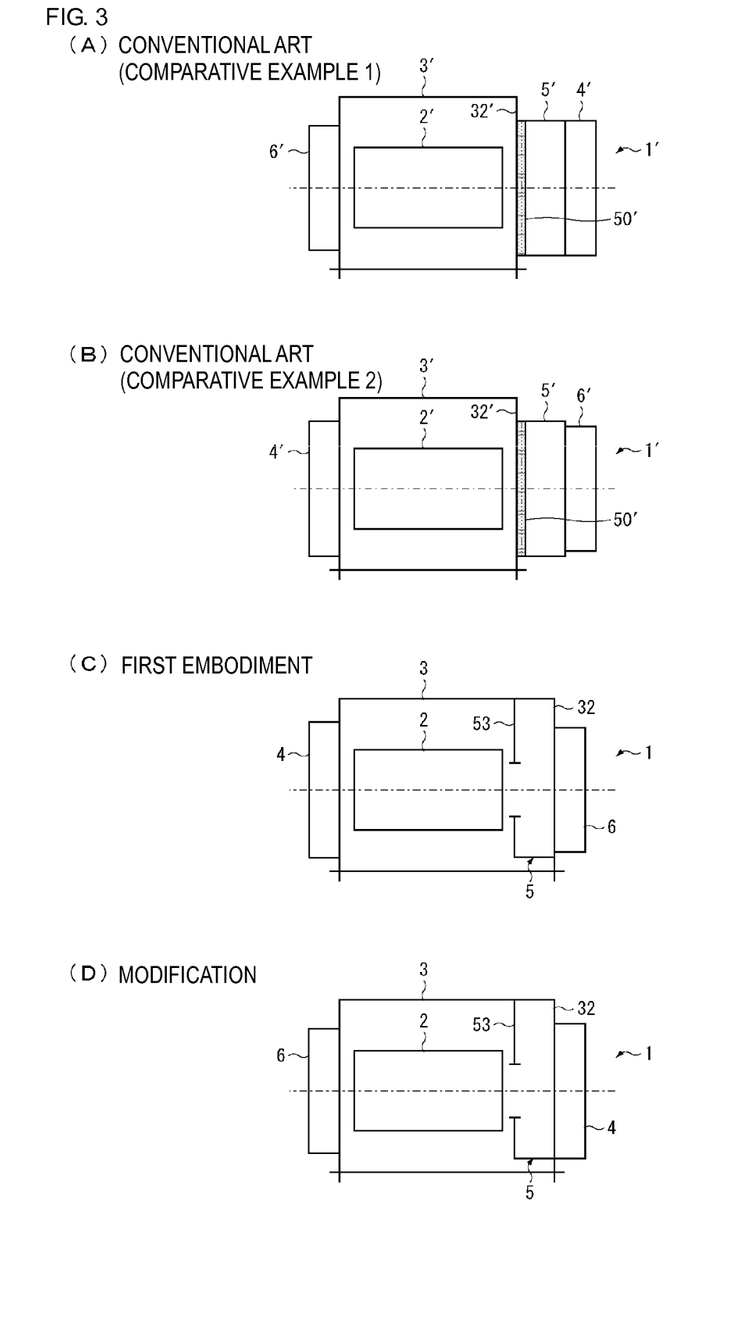
FIG. 3 shows the basic concept of the present invention, (A) shows a conventional art showing Comparative Example 1, (B) shows a conventional art showing Comparative Example 2, (C) shows the first embodiment, and (D) shows a modification.

Here, FIG. 3 shows the basic concept of the present invention, (A) shows a conventional art showing Comparative Example 1, (B) shows a conventional art showing Comparative Example 2, (C) shows the first embodiment, and (D) shows a modification. In each figure, the configuration of seat belt retractor 1 is conceptualized.

The seat belt retractor 1' according to a conventional art (Comparative Example 1) shown in FIG. 3 (A) is described, for example, in Patent Literature 1. In such a seat belt retractor 1', a locking mechanism 6' is disposed on one side of a base frame 3', and a pretensioner 5' and a spring unit 4' are disposed on the opposite side. This seat belt retractor 1' is configured such that an engaging pawl (not shown) of the locking mechanism 6' engages with internal teeth (not shown) of an opening formed in an end face 32' of the base frame 3', and therefore a spool 2' cannot be borne by the opening of the base frame 3'. So, a bearing component 50' (for example, a pretensioner plate) is disposed between the base frame 3' and the pretensioner 5'.

The seat belt retractor 1' according to a conventional art (Comparative Example 2) shown in FIG. 3 (B) is described, for example, in Patent Literature 2. In such a seat belt retractor 1', a spring unit 4' is disposed on one side of a base frame 3', and a pretensioner 5' and a locking mechanism 6' are disposed on the opposite side. As with Comparative Example 1, this seat belt retractor 1' is also configured such that an engaging pawl (not shown) of the locking mechanism 6' engages with internal teeth (not shown) of an opening formed in an end face 32' of the base frame 3', and therefore a spool 2' cannot be borne by the opening of the base frame 3'. So, a bearing component 50' (for example, a bearing ring) is disposed between the base frame 3' and the pretensioner 5'.

The seat belt retractor 1 according to the first embodiment shown in FIG. 3 (C) is shown in FIG. 1 and FIG. 2. In such a seat belt retractor 1, a pretensioner 5 is disposed on the inner side of one side of a base frame 3, a locking mechanism 6 is disposed on the outer side of the one side, and a spring unit 4 is disposed on the opposite side. As shown in FIG. 1 and FIG. 2(B), as with the conventional arts, this seat belt retractor 1 is configured such that an engaging pawl 61 of the locking mechanism 6 engages with internal teeth of an opening 32a formed in an end face 32 of the base frame 3, and therefore a spool 2 cannot be borne by the opening 32a of the base frame 3. So, in this embodiment, the pretensioner 5 is disposed inside the base frame 3, and the spool 2 is borne by an opening 53a formed in a cover member 53.

In the seat belt retractor 1 according to a modification of the first embodiment shown in FIG. 3 (D), the arrangement of the spring unit 4 and the locking mechanism 6 shown in FIG. 3 (C) is reversed. As described above, a locking mechanism 6 that stops the withdrawal of the webbing in an emergency or a spring unit 4 that biases the spool 2 in the retracting direction may be disposed on the outer side of the end face 32 of the base frame 3 on which the cover member 53 is disposed. The arrangement of the spring unit 4 and the locking mechanism 6 is arbitrarily set according to the configuration of the seat belt retractor 1.

The configuration of the seat belt retractor 1 shown in FIG. 3 (A) to (D) is a conceptual diagram in which the structure is simplified. For example, the lock gear and the pawl of the locking mechanism 6, 6' may be separately disposed on both sides of the base frame 3.

Figure 4:
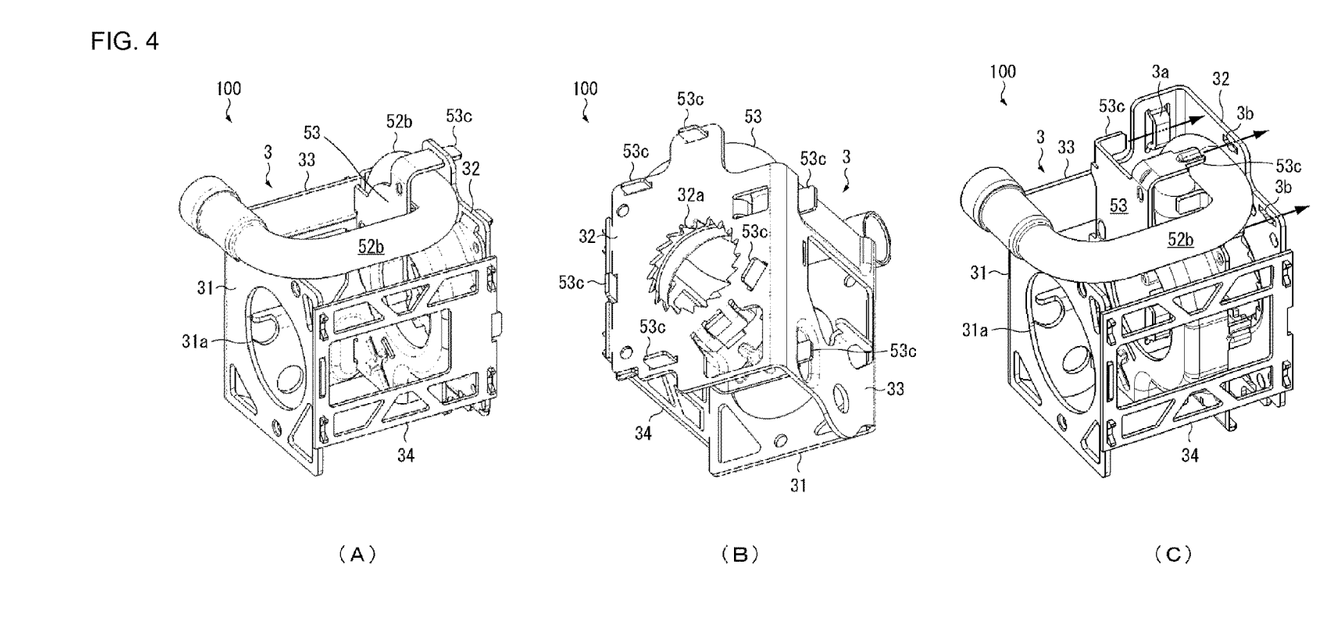
FIG. 4 shows a frame body, (A) shows a front perspective view, (B) shows a back perspective view, and (C) shows a modification.

Next, the configuration of a frame body 100 forming the framework of the seat belt retractor 1 will be described with reference to FIGS. 4 (A) and (B). Here, FIG. 4 shows the frame body, (A) shows a front perspective view, (B) shows a back perspective view, and (C) shows a modification.

Metal components such as the base frame 3 and the guide pipe 52b of the pretensioner 5 described above may be coated with an anticorrosion coating from the viewpoint of preventing corrosion. In the conventional seat belt retractors 1' shown in FIGS. 3 (A) and (B), a cover member is disposed outside the base frame 3'. Therefore, the cover member needs to be fixed to the base frame 3' after assembling the components of the pretensioner 5'. Therefore, metal components such as the base frame 3', the guide pipe, and the cover member need to be coated by separately impregnating them with anticorrosion paint.

In contrast, in the seat belt retractor 1 according to the first embodiment, since the cover member 53 is disposed inside the base frame 3, after forming a frame body 100 in which the guide pipe 52b and the cover member 53 are fixed to the base frame 3, other components can be assembled through the opening 32a formed in the end face 32 of the base frame 3. Therefore, after forming the frame body 100, the frame body 100 can be coated with an anticorrosion coating by impregnating it with anticorrosion paint, a plurality of components can be anticorrosion-treated at once, the number of steps of anticorrosion treatment can be reduced, and the burden of treatment work can be reduced.

In the conventional seat belt retractors 1' shown in FIGS. 3 (A) and (B), since the pretensioner 5' is disposed outside the base frame 3', a cover member has to be fixed to the end face 32 of the base frame 3'.

In contrast, in the seat belt retractor 1 according to the first embodiment, since the cover member 53 is disposed inside the base frame 3, the cover member 53 can be connected to both the end face 32 and the side face 33 of the base frame 3, and the cover member 53 can be fixed firmly. For example, as shown in FIG. 4 (B), a plurality of protrusions 53c are formed on the outer periphery of the cover member 53, and the cover member 53 can be fixed to the base frame 3 by passing the protrusions 53c through openings formed in the end face 32 and the side face 33 of the base frame 3 or disposing the protrusions 53c along the edge portions and then swaging and bending the protrusions 53c as necessary.

Alternatively, as in the modification shown FIG. 4 (C), the protrusions 53c of the cover member 53 may be passed through a passing portion 3a formed in the side face 33 of the base frame 3 or a through portion 3b formed in the end face 32. The passing portion 3a is formed by a bridge portion formed by causing part of the side face 33 of the base frame 3 to protrude inward. The passed protrusions 53c may or may not be bent. The arrangement of the protrusions 53c is not limited to the shown configuration, and the protrusions 53c are arbitrarily disposed according to the shapes of the base frame 3 and the cover member 53.

Figure 5:
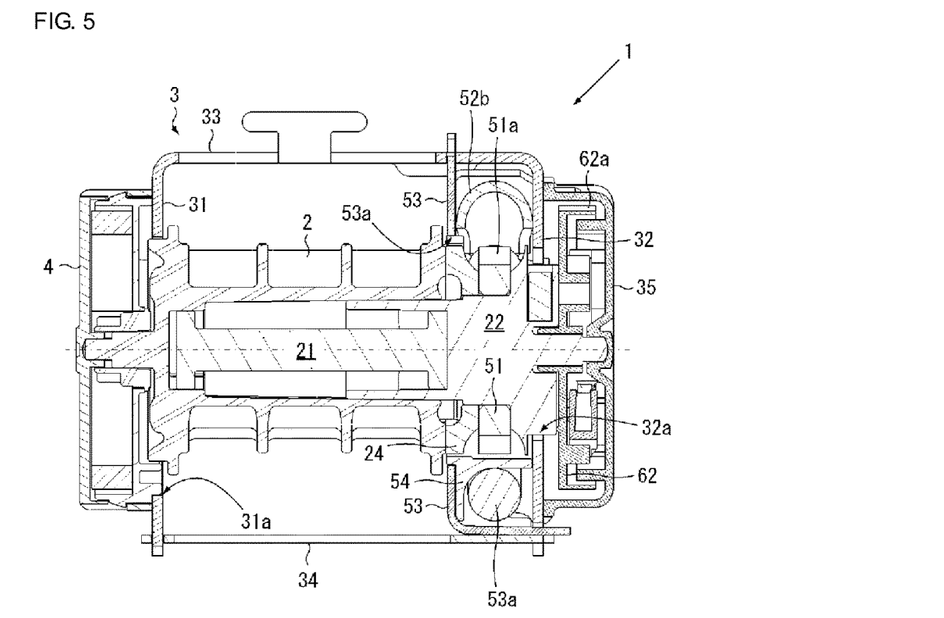
FIG. 5 is a sectional view showing a seat belt retractor according to a second embodiment of the present invention.

Next, a seat belt retractor 1 according to a second embodiment of the present invention will be described with reference to FIG. 5. Here, FIG. 5 is a sectional view showing the seat belt retractor according to the second embodiment of the present invention. This sectional view is the same sectional view as the B-B cross-sectional view shown in FIG. 2 (B). The same reference signs will be used to designate the same components as those of the seat belt retractor 1 according to the first embodiment described above, and redundant description will be omitted.

The seat belt retractor 1 according to the second embodiment shown in the figure is the same in the arrangement of the base frame 3, the spring unit 4, the pretensioner 5, and the locking mechanism 6 as the seat belt retractor 1 according to the first embodiment described above. The cover member 53 in the second embodiment is the same in the basic configuration as the first embodiment described above, but does not have the bent portion 53b in the opening 53a. Whether the bent portion 53b is formed in the opening 53a or not can be arbitrarily set.

In the pretensioner 5 in the second embodiment, a guide member 54 that guides the movement of the projectile 52a discharged into the cover member 53 is disposed. The guide member 54 is formed such that the projectile 52a is moved along the outline of the cover member 53. Therefore, owing to such a guide member 54, the discharged projectile 52a does not interfere with the rotor 51 (regardless of whether or not the rotor 51 is formed integrally with the locking base 22), and the driving of the rotor 51 can be stabilized.

The guide member 54 may have a shape externally fitted on the deformation plate 24. In this case, the radial load of the spool 2 may be supported indirectly by supporting the outer peripheral part of the guide member 54 with the opening 53a of the cover member 53 as shown in the figure.

Figure 6:
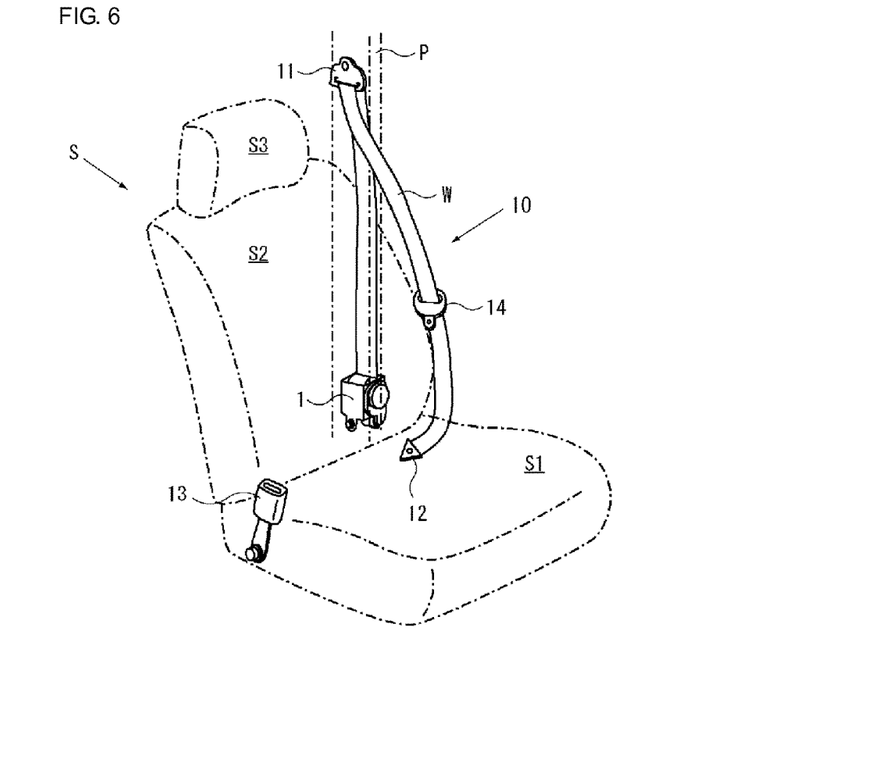
FIG. 6 is an overall configuration diagram showing a seat belt apparatus according to an embodiment of the present invention.

Next, a seat belt apparatus according to an embodiment of the present invention will be described with reference to FIG. 6. Here, FIG. 6 is an overall configuration diagram showing the seat belt apparatus according to an embodiment of the present invention. In FIG. 6, for the convenience of illustration, components other than the seat belt apparatus are shown by alternate long and short dash line.

The seat belt apparatus 10 according to this embodiment shown in FIG. 6 includes a webbing W that restrains an occupant, a seat belt retractor 1 that retracts the webbing W, a guide anchor 11 that is provided on the vehicle body side and that guides the webbing W, a belt anchor 12 that fixes the webbing W to the vehicle body, a buckle 13 disposed on a side face of a seat S, and a tongue 14 disposed on the webbing W. The seat belt retractor 1 includes, as shown in FIG. 1, a spool 2 that retracts the webbing W, a base frame 3 that rotatably houses the spool 2, a spring unit 4 that biases the spool 2 in the retracting direction, a pretensioner 5 that retracts the webbing W to take up the slack therein in an emergency, and a locking mechanism 6 that stops the withdrawal of the webbing W in an emergency. Because such a seat belt retractor 1 has the same configuration as that shown in FIG. 1 to FIG. 2 (B), the detailed description thereof will be omitted here.

The seat S includes, for example, a seat portion S1 in which the occupant is seated, a backrest portion S2 located behind the occupant, and a headrest portion S3 that supports the head of the occupant. The seat belt retractor 1 is housed, for example, in a B-pillar P of the vehicle body. In general, the buckle 13 is often disposed on a side face of the seat portion S1, and the belt anchor 12 is often disposed on the lower face of the seat portion S1. The guide anchor 11 is often disposed on the B-pillar P. One end of the webbing W is connected to the belt anchor 12, and the other end thereof is connected through the guide anchor 11 to the seat belt retractor 1.

Therefore, when fitting the tongue 14 into the buckle 13, the webbing W is withdrawn from the seat belt retractor 1 while sliding through a passing hole of the guide anchor 11. When the occupant fastens the seat belt or when the occupant unfastens the seat belt when the occupant gets out the vehicle, the webbing W is retracted by the action of the spring unit 4 of the seat belt retractor 1 until a predetermined load is applied.

The seat belt apparatus 10 described above is obtained by applying the seat belt retractor 1 according to this embodiment described above to an ordinary seat belt apparatus in a front seat. Therefore, also in the seat belt apparatus 10 according to this embodiment, the number of components and the size of the seat belt retractor 1 can be reduced. The seat belt apparatus 10 is not limited to the application to a front seat. For example, it can be easily applied also to a rear seat, with the guide anchor 11 omitted.

Of course, the present invention is not limited to the above-described embodiments, and may be applied to seat belt apparatuses used in transportation means other than vehicles, and various changes may be made without departing from the spirit of the present invention.

The invention claimed is:

1. A seat belt retractor comprising: a spool that retracts a webbing that restrains an occupant; a base frame that rotatably houses the spool; and a pretensioner that retracts the webbing to take up the slack therein in an emergency, wherein the pretensioner includes a rotor that is connected coaxially with the spool and that has a plurality of engaging teeth formed on the outer periphery thereof, a power generating means that is capable of ejecting an projectile that engages with the engaging teeth and rotates the rotor, and a cover member that houses at least the rotor and forms a movement path of the projectile, and wherein the base frame includes at least a first end face and a second end face opposing to each other, a side face directly connecting the first end face and the second end face, and the cover member is disposed between the first end face and the second end face.

2. The seat belt retractor according to claim 1, wherein the cover member can bear the spool directly or indirectly.

3. The seat belt retractor according to claim 2, wherein the cover member has an opening through which an end of the spool can be passed, and is configured to support the radial load of the spool with the inner edge of the opening.

4. The seat belt retractor according to claim 1, wherein a locking mechanism that stops the withdrawal of the webbing in an emergency or a spring unit that biases the spool in the retracting direction is disposed outside the base frame in which the cover member is disposed.

5. The seat belt retractor according to claim 1, wherein the power generating means includes an projectile that engages with the engaging teeth and rotates the rotor, a guide pipe that houses the projectile and guides the driving, and a gas generator that is disposed at an end of the guide pipe and that imparts power to the projectile, and wherein after forming a frame body in which the guide pipe and the cover member are fixed to the base frame, other components are assembled.

6. A seat belt apparatus comprising: a webbing that restrains an occupant; a seat belt retractor that retracts the webbing; a belt anchor that fixes the webbing to a vehicle body; a buckle disposed on a side face of a seat; and a tongue disposed on the webbing, wherein the seat belt retractor is the seat belt retractor according to claim 1.

* * * * *